United States Patent [19]

Jansons

[11] 4,361,693

[45] Nov. 30, 1982

[54] PREPARATION OF POLY(ARYLENE KETONES) USING THIO- AND DITHIOCARBONIC ACID DERIVATIVES

[75] Inventor: Viktors Jansons, Los Gatos, Calif.

[73] Assignee: Raychem Corporation, Menlo Park, Calif.

[21] Appl. No.: 281,528

[22] Filed: Jul. 8, 1981

[51] Int. Cl.³ .................... C08G 65/38; C08G 65/40
[52] U.S. Cl. .................................. 528/86; 528/125; 528/126; 528/128; 528/174; 528/175; 528/196; 528/198; 528/199; 528/200; 528/206; 528/207; 528/214; 528/215; 528/216; 528/217; 528/219; 528/370; 528/371; 528/372; 528/381; 528/351
[58] Field of Search ........ 528/125, 126, 128, 196–200, 528/214–217, 219, 370–372, 381, 391, 206–207, 86, 174, 175

[56] References Cited

U.S. PATENT DOCUMENTS

| | | | |
|---|---|---|---|
| 3,065,205 | 11/1962 | Bonner, Jr. | 528/125 |
| 3,093,537 | 6/1963 | Tilles | 167/22 |
| 3,219,679 | 11/1965 | Berezin et al. | 260/455 |
| 3,219,680 | 11/1965 | Olah | 260/455 |
| 3,441,538 | 4/1969 | Marks | 528/174 |
| 3,953,400 | 4/1976 | Dahl | 528/174 |
| 4,111,908 | 9/1978 | Dahl | 528/361 |
| 4,229,564 | 10/1980 | Dahl | 528/128 |
| 4,247,682 | 1/1981 | Dahl | 528/128 |

FOREIGN PATENT DOCUMENTS 971227 9/1964 United Kingdom .

OTHER PUBLICATIONS

"Carbonium Ions"–vol. 1, pp. 81–95–Edited by George A. Olah.

Primary Examiner—Lester L. Lee
Attorney, Agent, or Firm—Edith A. Rice; Herbert G. Burkard

[57] ABSTRACT

Poly(arylene ketones) are prepared by the reaction of difunctional aromatic compounds with derivatives of thio- or dithiocarbonic acids in the presence of a superacid catalyst system. In a preferred embodiment, diphenyl ether reacts with S-methyl chlorothioformate in HF/BF₃ to produce poly(p-phenyleneoxy-p-phenylene carbonyl), i.e. a polymer having the repeating unit

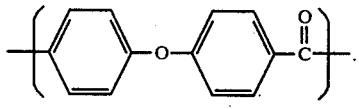

17 Claims, No Drawings

PREPARATION OF POLY(ARYLENE KETONES) USING THIO- AND DITHIOCARBONIC ACID DERIVATIVES

BACKGROUND OF THE INVENTION

1. Field of the Invention

This invention relates to the preparation of poly(arylene ketones).

2. Discussion of the Prior Art

U.S. Pat. No. 3,065,205 to Bonner discloses the preparation of aromatic polyketones by the reaction of aromatic compounds, such as diphenyl ether, with diacid chlorides in the presence of a Friedel-Crafts catalyst. British Pat. No. 971,227 discloses a similar process for making aromatic polyketones.

U.S. Pat. No. 3,441,538 to Marks discloses the preparation of poly(aromatic ketones) using a boron trifluoride/hydrogen fluoride catalyst system. The polymers are prepared from acyl halides, such as 4-phenoxybenzoyl chloride, or from the reaction of diacyl halides, such as terephthaloyl chloride, with difunctional nucleophilic aromatic compounds, such as diphenyl ether. Phosgene is reported to be a suitable diacyl halide. However, in Examples IX and X of that patent where the reactants are phosgene and diphenyl ether, very low yields, 1.5 and 1.1 percent respectively, of low molecular weight polymer were obtained. In Example IX, more than 50% of the diphenyl ether was recovered unreacted.

U.S. Pat. No. 3,953,400 to Dahl discloses crystalline melt processable polymers having the repeating unit

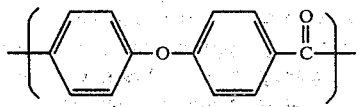

and having a mean inherent viscosity within the range of about 0.8 to about 1.65 and an elongation of at least 50%. The polymers are prepared, for example, by polymerization of a monomer such as 4-phenoxybenzoyl chloride or fluoride in the presence of a Friedel-Crafts catalyst and a suitable capping agent. The preferred Friedel-Crafts catalyst is a mixture of hydrogen fluoride and boron trifluoride.

SUMMARY OF THE INVENTION

It has now been discovered that poly(arlyene ketones) can be prepared by the reaction of difunctional aromatic compounds with certain carbonic acid derivatives, particularly thio- and dithiocarbonic acid derivatives. Accordingly, this invention comprises a method of preparing a polymer having the repeating unit

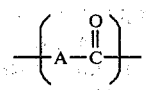

which comprises the reaction of a nucleophilic aromatic compound of the formula H-A-H, having two hydrogen atoms susceptible to displacement under Freidel-Crafts acylation conditions, with a carbonic acid derivative of the formula

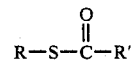

wherein R is a radical having a low tendency to form a carbonium ion and R' is an atom or group which is displaceable under Friedel-Crafts acylation conditions, in the presence of a superacid catalyst system consisting essentially of a mixture of at least an equimolar amount, per each basic species present or generated, of an inorganic halide Lewis acid selected from the group consisting of boron trifluoride, boron trichloride, boron tribromide, titanium tetrafluoride, titanium tetrachloride, titanium tetrabromide and the pentafluorides, pentachlorides and pentabromides of tantalum, niobium, phosphorus, arsenic and antimony, and at least an equimolar amount, based on said Lewis acid, of a strong acid selected from the group consisting of fluorosulfuric acid, hydrofluoric acid, and trifluoromethanesulfonic acid.

DETAILED DESCRIPTION OF THE INVENTION

The difunctional nucleophilic aromatic compound has the general formula H-A-H, wherein A is an aromatic diradical. The aromatic compound contains two hydrogen atoms which are susceptible to preferential displacement under Friedel-Crafts acylation conditions to give a substituted diacyl radical of the formula

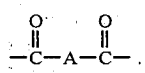

The aromatic diradical preferably contains at least two aromatic rings and at least one ether or sulfide linkage. Preferred radicals are of the formula:

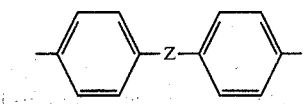

wherein Z is, for example, $-O-$, $-S-$, $-O(CH_2)_nO-$,

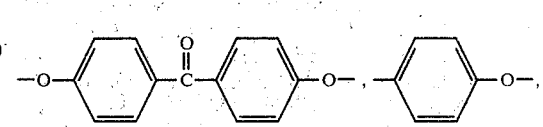

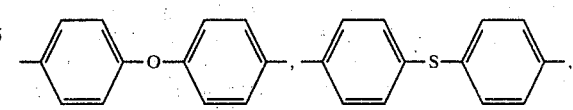

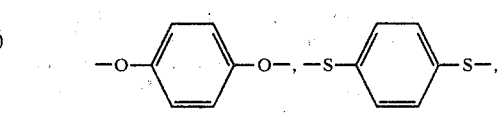

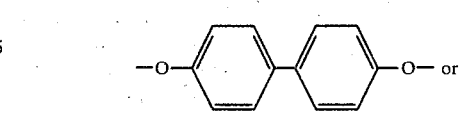

or

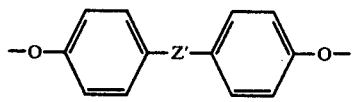

wherein Z' is, for example, —O—, —S—,

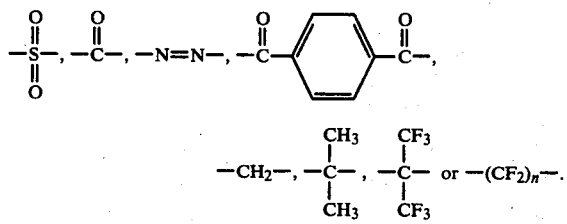

Other aromatic compounds which can be used are numerous and will be known to those skilled in the art. For example, a list of suitable nucleophilic aromatic compounds can be found in U.S. Pat. No. 3,441,538 to Marks, where use of compounds of this type is preparing poly(arylene ketones) by a different process is described. The disclosure of U.S. Pat. No. 3,441,538 is incorporated herein by reference.

Illustrative nucleophilic aromatic compounds which can be used are diphenyl ether, diphenyl sulfide, bis(4-phenoxyphenyl)sulfone, 1,4-diphenoxybenzene, 4,4'-diphenoxybenzophenone, 1,4-bis(4-phenoxybenzoyl)-benzene, 1,3-bis(4-phenoxybenzoyl)benzene, 1,2-diphenoxyethane, 2-chloro-1,4-diphenoxybenzene, 2,5-dichloro-1,4-diphenoxybenzene, 4-phenoxybiphenyl, 4,4'-diphenoxybiphenyl, bis(4-phenoxyphenyl)sulfide, dibenzofuran, dibenzodioxin and the like.

The carbonic acid derivative which reacts with the nucleophilic aromatic compound has the general formula

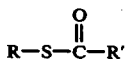

wherein R is a radical having a low tendency to form a carbonium ion such, for example, as an normal alkyl or ω-substituted n-alkyl radical, 1-bicyclo[2.2.1]heptyl or substituted 1-bicyclo[2.2.1]heptyl, 1-bicyclo[2.2.1]octyl or substituted 1-bicyclo[2.2.1]octyl radical, and the like, and R' is an atom or group which is readily displaceable under Friedel-Crafts acylation conditions such, for example, as a halogen, halogen/Lewis acid halide complex, N-imidazolyl, N-succinimido, 2,2-dimethyl-1-hydrazino, N-pyridinium halide, —S—R, —O—R" and —S—R" where R" is a radical having a low tendency to form a carbonium ion such, for example, as an normal alkyl or ω-substituted n-alkyl radical. The normal alkyl radicals represented by R and R" are straight chain alkyl radicals which preferably contain from 1 to about 20 carbon atoms. Particularly preferred are lower normal alkyl radicals containing from 1 to 4 carbon atoms. Typical substituents include alkyl, cycloalkyl, $CF_3$—, $CF_3CF_2$—, N≡C—, $NO_2$—, $CH_3CO$—, $CH_3SO_2$, $CH_3$—O—$CH_2$—, $CH_3$—S—$CH_2$— $(CH_3)_2NSO_2$—, $(CH_3)_2N$—, $NH_2SO_2$—, resin- or resin connected by an inert linkage, e.g., resin-$SO_2$—, where resin represents an inert polymeric support such as polyethylene.

The term "low tendency to form a carbonium ion" means that the radical R has a relatively low tendency to form a carbonium ion under the conditions of the reaction. It has been found that acyl compounds of the above formula wherein the R is a radical that has a tendency to form a carbonium ion lower than that of the isopropyl radical under the same conditions are suitable for use in the reaction of this invention. One measure of the tendency of a radical to form a carbonium ion is the heat of carbonium ion formation of the ion. The radical R should have a heat of formation above about 190 kilocalories per mole. A discussion on the heats of formation of carbonium ions can be found in "Carbonium Ions", edited by George A. Olah (Interscience Publishers, 1968) in Volume 1 at pages 81–95.

The term "displaceable under Friedel-Crafts acylation conditions" means that the particular group or atom is displaced from the molecule under the well known conditions for Friedel-Crafts acylation to occur. In particular, the group or atom is displaceable from the molecule under the reaction conditions of this invention. Thus, the hydrogen atoms of the compound H-A-H and the atom or group R' of the acyl compounds are displaceable under the reaction conditions specified herein.

Typical carbonic acid derivatives which can be used are S-alkyl halothioformates and alkyl ester and S-thioester derivatives of thio- and dithiocarbonic acids. The term "halo" is meant to include chloro, bromo, fluro and iodo. Preferred carbonic acid derivatives are S-alkyl chlorothioformates such as S-methyl chlorothioformate or S-ethyl chlorothioformate. Alkyl chlorothioformates are well known and can be readily synthesized by known method (see, for example, U.S. Pat. No. 3,093,537, which discloses a process for the preparation of S-alkyl chlorothioformates by the reaction of an alkanethiol with phosgene in contact with activated carbon). The preparation of S-alkyl fluoro- thioformates by the reaction of the corresponding alkyl chlorothiocarbonates with anhydrous hydrogen fluoride is taught in U.S. Pat. No. 3,219,680.

The ester and S-thioester derivatives of carbonic acids can be prepared by the reaction of an S-alkyl chlorothioformate or other carbonyl containing compound, e.g. phosgene, N,N-carbonyldiimidazole or alkyl chloroformate, with an alkanol or alkanethiol.

The polymerization reaction is carried out in the presence of a superacid catalyst system. The catalyst consists of a mixture of at least an equimolar amount, based on each basic species present or generated during the reaction, of an inorganic halide Lewis acid selected from the group consisting of boron trifluoride, boron trichloride, boron tribromide, titanium tetrafluoride, titanium tetrachloride, titanium tetrabromide and the pentafluorides, pentachlorides and pentabromides of tantalum, niobium, phosphorus, arsenic and antimony, together at least an equimolar amount, based on each basic species present or generated, of a strong proton acid selected from the group consisting of fluorosulfuric acid, hydrofluoric acid (also referred to herein as hydrogen fluoride) and trifluoromethanesulfonic acid.

The inorganic halide Lewis acid is present in at least an equimolar amount for each basic group or species present or generated in the polymerization reaction mixture. Examples of such basic species include

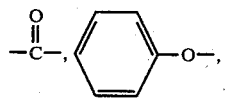

R—S—, R—O— (where R is as defined before), and any water if present in hydrogen fluoride. It is preferred to use an amount of Lewis acid that is from about 1.2 to about 10 moles per mole of the basic species. The strong proton acid is present in the catalyst system in at least an equimolar amount based on each basic species present or generated. In general, the strong proton acid should be present in an amount of about 2 to about 40 moles per mole of Lewis acid.

While not wanting to be limited by the following, it is believed that the polymerization process of this invention occurs in the following manner: (i) the carbonic and derivative

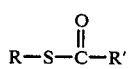

undergoes a displacement, in the superacid medium and in the presence of H-A-H, of the most labile atom or group, namely R' in the asymmetrical derivatives, or one of the -S-R groups in the symmetrical derivatives (where R' and -S-R are the same), to give the highly electrophilic acylating species

as an intermediate, (ii) this intermediate displaces a labile hydrogen of H-A-H or intermediate acylation product to give species such as

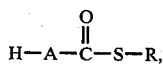

(iii) the protonated thioester loses RSH to give a new electrophilic acylation intermediate

and (iv) further acylation of -A-H by this intermediate produces polymeric species.

The process of the invention can be carried out at autogenous pressures but higher pressure can be used if desired. Usually it will be desirable to carry out the reacton under elevated pressures of about 2 to about 20 atmospheres. It is particularly preferred to use boron trifluoride as the organic halide Lewis acid and to conduct the reaction under conditions such that the partial pressure of the boron trifluoride during the course of the reaction is up to about 2 or 3 atmospheres.

The reaction medium can be a polar solvent, optionally with an inert diluent. The strong proton acid, particularly if hydrofluoric acid, can be used as the reaction medium, if desired. Illustrative examples of other polar solvents which can be used are sulfur dioxide, tetramethylene sulfone, nitrobenzene, nitromethane, nitroethane, sulfurylfluorochloride, and mixtures of these. The polar solvent employed should preferably be such that the aromatic compound, the carbonic acid derivative and the catalyst system form a homogenous solution in the solvent. The polar solvent should preferably also be present in an amount such that the combined weight of the reactants ranges from about 5 up to about 70 weight percent of the weight of the polar solvent. Inert diluents which can be used along with the polar solvent include normal alkanes containing 3 to 10 carbon atoms, and geminal polychloro-, polyfluoro- and poly(fluorochloro)- n-alkanes containing 1 to 10 carbon atoms, sulfur dioxide, sulfolane and the like. A preferred reaction medium consists essentially of anhydrous hydrofluoric acid.

The reaction temperature can be from about $-25°$ C. to about $+75°$ C. and is preferably in the range of about $0°$ C. to about $35°$ C. and particularly from about $0°$ C. to about $20°$ C.

A particular advantage of this invention is that it provides a process for the preparation of a large number of different and useful homopolymers and copolymers containing various aromatic ketone repeating units. A further advantage is that simple and low cost carbonic acid derivatives may be employed, an may be polycondensed with readily accessible aromatic compounds (some of which are commercial products) to afford low cost poly(arylene ketones).

The following examples illustrate the preparation of poly(arylene ketones) by the process of this invention.

EXAMPLE 1

A 50-ml poly(chlorotrifluoroethylene) (PCTFE) tube was charged with 1.7021 g (10.0 mmoles) of diphenyl ether and 1.2457 g (10.0 mmoles) of S-ethyl chlorothioformate. The reaction mixture was cooled to $-70°$ C., 10 milliliters of anhydrous hydrogen fluoride was added, and the reaction tube was connected to a PCTFE vacuum line (Toho Kasei Co., Ltd.). Boron trifluoride, at a pressure of 30 psi, was introduced while the tube was allowed to come to room temperature. The stirred reaction mixture was vented at room temperature to expel hydrogen chloride. The boron trifluoride pressure was reapplied (30 psi) and the reaction was allowed to proceed at room temperature for 20 hours, which produced a light orange colored, highly viscous solution. The reaction system was vented and the viscous solution was diluted with 30 ml of anhydrous hydrogen fluoride followed by precipitation into cold ($-20°$ C.) methanol agitated in a Waring blender. The resulting fibrous polymeric precipitate was washed with water and methanol and then dried at $150°$ C. under a pressure of 20 mm Hg, to give 1.90 g (9.7 mmoles, 97%) of a colorless fluffy material having an inherent viscosity of 1.24 (0.1 g/100 ml conc. $H_2SO_4$, $25°$ C.). The inherent viscosity was measured in this and succeeding examples by the method of Sorenson et al., "Preparative Methods of Polymer Chemistry", Interscience (1968), page 44. The polymer was compression molded at a temperature of $400°$ C. under a pressure of 10,000 psi for 5 min. to give a tough, flexible, light brown slab. Infrared (IR) and nuclear magnetic resonance (NMR) spectral data confirmed that the polymer had the repeating unit

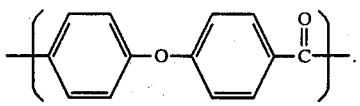

EXAMPLE 2

The process described in Example 1 was repeated using 3.6640 g (10.0 mmoles) of 4,4'-diphenoxybenzophenone and 1.2459 g (10.0 mmoles) of S-ethyl chlorothioformate to give a colorless polymer with an inherent viscosity of 0.94. Compression molding yield a tough, flexible slab. IR and NMR data confirmed that the polymer had the repeating unit

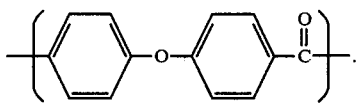

EXAMPLE 3

The process described in Example 1 was repeated using 3.221 g (0.01892 mole) of diphenyl ether and 2.100 g (0.01899 mole) of S-methyl chlorothioformate in 15 ml of anhydrous hydrogen fluoride. The product was compression molded to yield a dark tan flexible slab. The inherent viscosity of the polymer was 0.67. IR and NMR confirmed that the polymer produced had the repeating unit

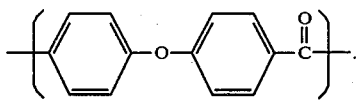

EXAMPLE 4

The process described in Example 1 was repeated using a 4.72 g (0.100 mole) 1,4-diphenoxybenzene in 12.53 g (0.10057 mole) ethyl chlorothioformate and 15 ml of anhydrous hydrogen fluoride. The resulting two layer reaction mixture, containing a viscous bottom layer was diluted with 10 ml hydrogen fluoride before work-up. The product was a white polymer having an inherent viscosity of 0.72. It formed a tough, flexible, light-colored slab on compression molding. IR and NMR spectral analysis confirmed that the polymer had the repeating unit

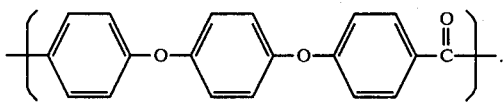

EXAMPLE 5

The process described in Example 1 was repeated using 10.15 g (0.0387 mole) of 1,4-diphenoxybenzene and 5.089 g (0.0408 mole) S-ethyl chloroformate in 50 ml of anhydrous hydrogen fluoride, yielding a polymerization mixture consisting of a highly viscous bottom layer and a low viscosity upper layer. Dilution with 30 ml liquidsulfur dioxide produced a viscous solution. This was stirred for an additional two hours under 30 psi borontrifluoride, then vented and diluted with 20 ml anhydrous hydrogen fluoride, followed by precipitation into cold acetone-water (2:1 by volume) solution and agitated in a Waring blender. The resulting fibrous polymer precipitate was washed with methanol and water, then dried. The product was a white polymer having an inherent viscosity of 1.54. The polymer formed a tough, flexible, light-colored slab on compression molding. The IR and NMR spectral analysis confirmed that the polymer had the repeating unit

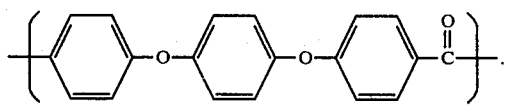

EXAMPLE 6

S,S-diethyl dithiocarbonate was prepared by gradually adding 6.21 g (0.01 mole) of ethanethiol at a temperature of 15°–30° C. to a stirred, cooled slurry of 8.10 g (0.05 mole) of N,N'-carbonyldiimidazole in 50 ml of methylene chloride. The resulting clear, colorless solution was extracted with water, dilute hydrochloric acid and then again with water; and the organic layer evaporated to dryness. The residue was dried at 24° C. under a pressure of 0.1 mm Hg to yield 4.04 of a colorless oil. IR and NRM confirmed that the product was S,S-diethyl dithiocarbonate.

To a frozen solution of 1.70 g (0.0100 mole) diphenyl ether and 1.51 g (0.01005 mole) of S,S-diethyl dithiocarbonate (prepared as above) was added 8 ml of anhydrous hydrogen fluoride. Boron trifluoride at a pressure of 30 psi was introduced into the reaction vessel and the pressure was maintained at 30 psi for 19 hours at 24° C. The resulting viscous solution was diluted with 10 ml of hydrogen fluoride and precipitated into cold methanol/acetone solution (1:1 by volume) agitated in a Waring blender. The resulting fibrous polymeric precipitate was washed with methanol, acetone, and water, and then dried at 120° C. under vacuum. A white, flexible, fibrous product weighing 1.89 g was obtained. The polymer had an inherent viscosity of 0.52. IR and NMR confirmed that the polymer had the repeating unit

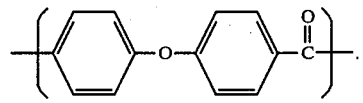

EXAMPLE 7

O-methyl S-ethyl thiocarbonate was prepared by mixing 30 ml (36 g, 0.3 mole) of S-ethyl chlorothiocarbonate, 50 ml (40 g, 1.2 mole) of anhydrous methanol and 1 drop of pyridine. The mixture was refluxed for 2.5 hours and then distilled at atmospheric pressure. The distillation produced a first cut of about 40 ml at up to 80° C. consisting mostly of methanol, a second cut at 80°–130° C. consisting of two layers, a single phase cut of 5 ml at 130°–138° C., a single phase product cut of 6 ml at 138°–9° C. consisting of O-methyl S-ethyl thiocarbonate (confirmed by IR and NMR), an after cut of 1 ml and a 1 ml residue.

The polymerization procedure of Example 6 was repeated using 1.70 g (0.010 mole) of diphenyl ether and 1.21 g (0.01007 mole) of O-methyl S-ethyl thiocarbonate. The polymer produced had an inherent viscosity of 0.72. IR and NMR confirmed that the polymer had the repeating unit

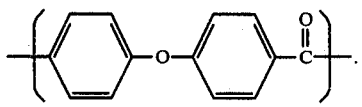

What is claimed is:

1. A method of preparing a polymer having the repeating unit

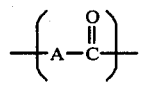

which comprises reacting a nucleophilic aromatic compound of the formula H-A-H wherein A is an aromatic diradical and each H is displaceable under Friedel-Crafts acylation conditions, with a carbonic acid derivative of the formula $$R-S-\overset{\overset{O}{\|}}{C}-R'$$

wherein R is a radical having a low tendency to form a carbonium ion and R' is an atom or group which is displaceable under Friedel-Crafts acylation conditions, in the presence of a superacid catalyst system consisting essentially of a mixture of at least an equimolar amount, based on said aromatic compound, of an inorganic halide Lewis acid selected from the group consisting of boron trifluoride, boron trichloride, boron tribromide, titanium tetrafluoride, titanium tetrachloride, titanium tetrabromide and the pentafluorides, pentachlorides or pentabromides of tantalum, niobium, phosphorus, arsenic and antimony, and a molar excess, based on said Lewis acid, of a strong acid selected from the group consisting of fluorosulfuric acid, hydrofluoric acid, and trifluoromethanesulfonic acid.

2. A method of preparing a polymer having the repeating unit

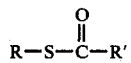

which comprises reacting a nucleophilic aromatic compound of the formula H-A-H wherein A is an aromatic diradical containing at least two aromatic rings and at least one ether or sulfide linkage, with a compound of the formula $$R-S-\overset{\overset{O}{\|}}{C}-R'$$

wherein R is an n-alkyl or a substituted normal alkyl radical and R' is selected from the group consisting of halogen, —O—R" and —S—R" where R" is a normal alkyl or substituted n-alkyl radical, in the presence of a superacid catalyst system consisting essentially of a mixture of at least an equimolar amount, based on said aromatic compound, of an inorganic halide Lewis acid selected from the group consisting of boron trifluoride, boron trichloride, boron tribromide, titanium tetrafluoride, titanium tetrachloride, titanium tetrabromide and the pentafluorides, pentachlorides or pentabromides of tantalum, niobium, phosphorus, arsenic and antimony, and a molar excess, based on said Lewis acid, of a strong acid selected from the group consisting of fluorosulfuric acid, hydrofluoric acid, and trifluoromethanesulfonic acid.

3. A process in accordance with claim 1 wherein said reaction is carried out in a polar solvent comprising sulfur dioxide, tetramethylene sulfone, nitrobenzene, nitromethane, nitroethane, sulfurylfluorochloride, or a mixture of two or more of these.

4. A process in accordance with claim 3, wherein said polar solvent contains an inert diluent selected from the group consisting of $C_3$ to $C_{10}$ n-alkanes and $C_1$ to $C_{10}$ geminal polychloro-, polyfluoro- and poly(fluorochloro)-n-alkanes.

5. A process in accordance with claim 3, wherein the combined weight of said aromatic compound, said catalyst system and said carbonic acid derivative together ranges from about 5 to about 70 weight percent of the weight of said polar solvent.

6. A process in accordance with claim 3, wherein said aromatic compound, said catalyst system and said carbonic acid derivative form a homogeneous solution in said polar solvent.

7. A process in accordance with claim 1, wherein said reaction is carried out in a reaction medium consisting essentially of anhydrous hydrofluoric acid.

8. A process in accordance with claim 1, wherein said reaction is effected at a temperature ranging from about −25° C. to about +75° C.

9. A process in accordance with claim 1, wherein said reaction is effected at a temperature ranging from about 0° C. to about +35° C.

10. A process in accordance with claim 1, wherein said reaction is effected at a temperature ranging from about 0° C. to about +20° C.

11. A process in accordance with claim 1, wherein said inorganic halide Lewis acid is boron trifluoride or antimony pentafluoride.

12. A process in accordance with claim 11, wherein said organic halide Lewis acid is boron trifluoride and the partial pressure of said boron trifluoride during the course of said reaction is up to about 3 atmospheres.

13. A process in accordance with claim 1, wherein said carbonic acid derivative is selected from the group consisting of S-methyl chlorothioformate, S-ethyl chlorothioformate, S-methyl fluorothioformate, S-ethyl fluorothioformate, O-methyl S-ethyl thiocarbonate, O-ethyl S-methyl thiocarbonate, O,S-dimethyl thiocarbonate, O,S-diethyl thiocarbonate, S,S-dimethyl dithiocarbonate and S,S-diethyl dithiocarbonate.

14. A process in accordance with claim 13 wherein said aromatic compound is diphenyl ether.

15. A process in accordance with claim 13 wherein said aromatic compound is 4,4'-diphenoxybenzophenone, 1,4-bis(4-phenoxybenzoyl)benzene, or 1,3-bis(4-phenoxybenzoyl)benzene.

16. A process in accordance with claim 13 wherein said aromatic compound is 1,4-diphenoxybenzene.

17. A process in accordance with claim 13 wherein said aromatic compound is 2-chloro-1,4-diphenoxybenzene or 2,5-dichloro-1,4-diphenoxybenzene.

* * * * *